(12) United States Patent
Havens et al.

(10) Patent No.: US 7,946,493 B2
(45) Date of Patent: May 24, 2011

(54) WIRELESS BAR CODE TRANSACTION DEVICE

(75) Inventors: William H. Havens, Syracuse, NY (US); James A. Cairns, Victor, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 131 days.

(21) Appl. No.: 11/904,439

(22) Filed: Sep. 27, 2007

(65) Prior Publication Data

US 2009/0088203 A1    Apr. 2, 2009

(51) Int. Cl.
*G06K 7/10*    (2006.01)
(52) U.S. Cl. .................... 235/462.42; 235/381
(58) Field of Classification Search .................. 235/462, 235/454, 462.06, 462.08, 462.09, 462.12, 235/462.31, 462.42, 462.45, 462.46, 378, 235/381, 385; 382/313, 318, 321
See application file for complete search history.

(56) References Cited

U.S. PATENT DOCUMENTS

| | | | | |
|---|---|---|---|---|
| 5,424,524 A * | 6/1995 | Ruppert et al. | ................ | 235/383 |
| 5,457,308 A * | 10/1995 | Spitz et al. | ................ | 235/462.12 |
| 5,478,997 A * | 12/1995 | Bridgelall et al. | ........ | 235/462.25 |
| 5,825,006 A * | 10/1998 | Longacre et al. | ......... | 235/462.27 |
| 6,512,919 B2 * | 1/2003 | Ogasawara | ................ | 455/422.1 |
| 6,691,919 B1 * | 2/2004 | Katz et al. | ................ | 235/462.01 |
| 6,947,571 B1 * | 9/2005 | Rhoads et al. | ................ | 382/100 |
| 7,195,157 B2 * | 3/2007 | Swartz et al. | ................ | 235/383 |
| 2005/0001035 A1 * | 1/2005 | Hawley et al. | ............ | 235/462.21 |
| 2005/0056699 A1 * | 3/2005 | Meier et al. | .................... | 235/454 |
| 2006/0255149 A1 * | 11/2006 | Retter et al. | ............. | 235/462.41 |
| 2006/0274171 A1 * | 12/2006 | Wang | ............................ | 348/294 |
| 2007/0041101 A1 * | 2/2007 | Goosey et al. | ................ | 359/676 |

\* cited by examiner

*Primary Examiner* — Thien M Le
(74) *Attorney, Agent, or Firm* — Hickory & Barclay, LLP

(57) ABSTRACT

A cellular camera telephone includes: a photosensor for capturing an image of a target; at least one illumination source for projecting an aiming pattern to a bar code indicia in the target and illuminating the bar code indicia for image capture; a processor for decoding bar code indicia in the image; a button for activating image capture and decoding; a switchable lens assembly comprising a fixed lens and one or more secondary lens for superimposing over the fixed lens to change focal range of the cellular camera.

13 Claims, 1 Drawing Sheet

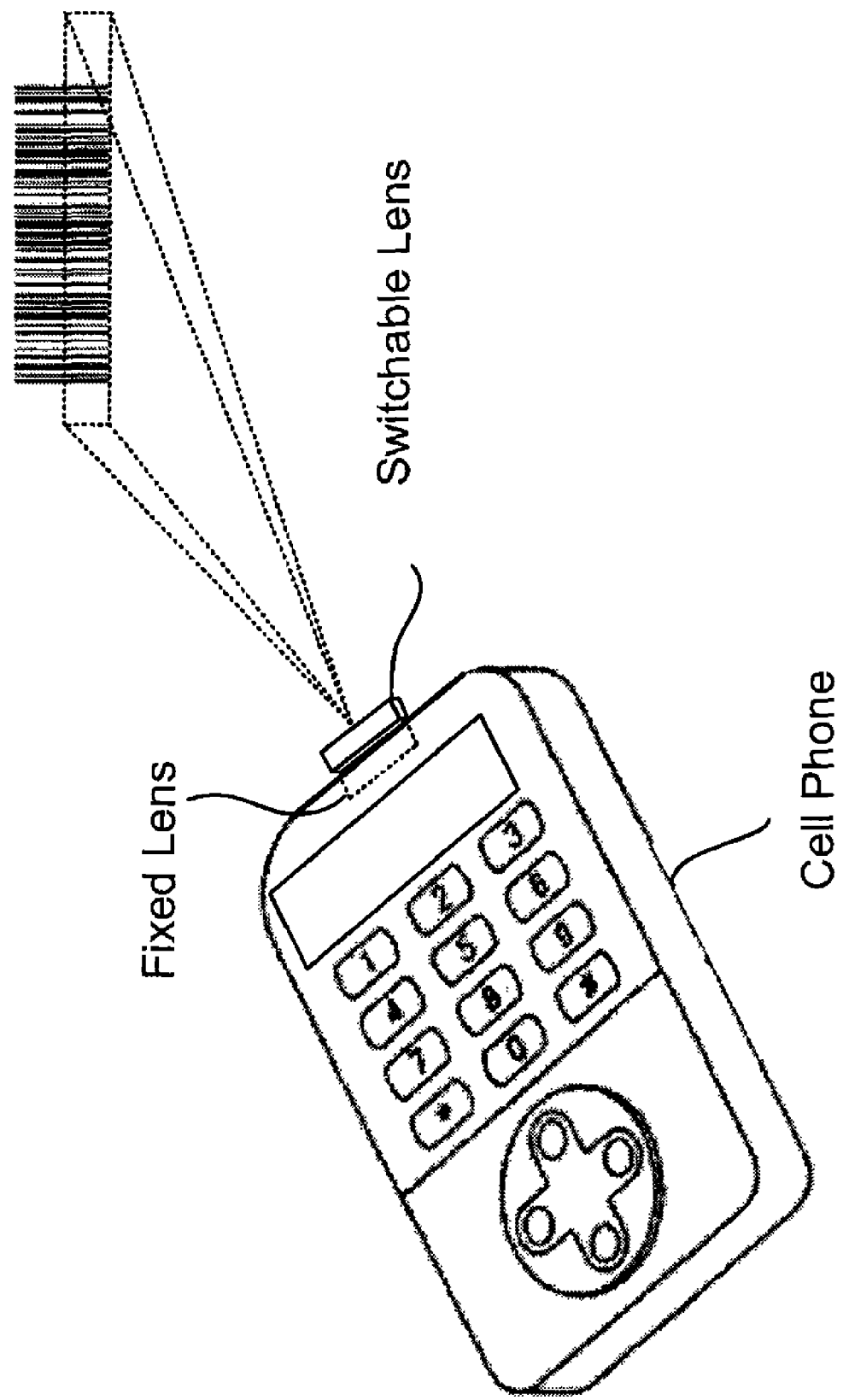

WIRELESS BAR CODE TRANSACTION DEVICE

FIELD OF THE INVENTION

The present invention relates to wireless transaction devices, particularly cellular telephones, that are enabled as optical bar code indicia reading devices, and to their uses. More particularly, the invention relates to use cellular camera telephones that include the capability of reading and decoding bar code indicia, and of using the information in those indicia to perform a variety of functions and transactions

BACKGROUND

Optical bar code readers read data represented by bar code symbols. A bar code symbol is an array of rectangular bars and spaces that are arranged in a specific way to represent elements of data in machine readable form. Optical bar code readers typically transmit light onto a symbol and receive light reflected off of the symbol. The received light is interpreted to extract the data represented by the symbol.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively high resolution in one dimension only, but multiple linear scans, or two-dimensional scans, are needed to read the whole symbol.

A class of bar code symbologies known as two dimensional (2D) matrix symbologies have been developed which offer greater data densities and capacities than 1D symbologies. 2D matrix codes encode data as dark or light data elements within a regular polygonal matrix, generally accompanied by graphical finder, orientation, and/or reference structures.

Bar codes are widely used to encode information about goods and services. They are used, either directly or with associated packaging, on an enormous range of goods and products. These include consumer goods such as food and beverage items, personal care products, clothing and apparel, home furnishings, linens, kitchenware, pharmaceuticals, hardware, electronics, appliances, sports and exercise equipment, toys and games, and reading materials. Manufacturing and industrial goods and equipment, including raw (such as felled timber) and finished goods, are also commonly marked directly with, or associated to, bar codes. The codes may contain information including the description of the item, pricing, size, weight, source or manufacturer—in short, any desired information that can be captured within the data capacity constraints of the particular bar code symbology being used.

The usefulness of bar codes is not limited to goods and products, but extends to services. Vehicle rental and transportation-for-hire, such as car rental or leasing and travel by airplane, train, ship, subway, and bus may all be effected through transactions that include the use of bar codes, as may reservation and use of hotel facilities; use of mail, courier, and other package delivery services; rental of lockers and other storage facilities; and event ticketing, such as for movies, concerts, lectures or speeches, plays, seminars, and trade shows. It is, in fact, reasonable to say that any transaction involving an exchange of money for goods or services may be facilitated by use of bar codes, and that many, if not most, such transactions are so facilitated.

Historically the most common use for bar codes in consumer transactions is simply to correlate the item being purchased with its current price, but the potential uses are much broader. When a bar code is scanned at, for example, the checkout counter of a retail store, a simple and direct use of the information in the bar code is to query a store lookup database to retrieve the current pricing of the product in question. A second layer of usefulness can be added by using the bar code information to track store inventory. A third layer might involve using the information for promotional programs, such as triggering printout of coupons based on the items being purchased. If the transaction is of the type where the customer has electronically identified him- or herself to the sore, as by using a customer identification card or store-issued credit or debit card, the store might also link the items being purchased to the customer's record, and this information could be used for rebates, buying incentive programs, or mailing of targeted promotional materials to the customer, for example.

Until recently, use of bar codes has been largely limited to the vendor. First, there have been few products available to the customer or consumer for capturing and using bar code information. Portable, hand-held electronic devices for consumers have been present for many years, such as Personal Digital Assistants (PDAs) and cellular telephones. However, bar code scanning capability has been provided only in dedicated devices that were not aimed at the consumer market, and which generally would have presented a very unfavorable cost/benefit profile for that market. These dedicated scanners are generally quite expensive, and there has simply been no application for their use that would benefit a consumer proportionately to their cost.

The present invention is therefore directed to providing affordable consumer devices for scanning and reading bar code symbols, and to a number of valuable uses for such devices. (As used herein, terms such as "capturing", "acquiring", and "scanning" a bar code refer to acquisition of the bar code image by a photosensor in the cell phone with sufficient resolution to permit decoding, while terms such as "reading" and "decoding" a bar code refer to processing the image information in order to extract the encoded information.)

DETAILED DESCRIPTION

Cellular camera telephones, also referred to herein for convenience simply as "cell phones", are widely known and used on a global basis. (Use of the phrases "cellular camera telephone" and "cell phone" herein refers to any cellular telephone having the capability to capture a still image.) However, providing a cell phone with the processing circuitry necessary to recognize and decode bar codes would be unlikely to produce a satisfactory device.

In order to quickly and reliably capture a bar code, the cell phone and the bar code should be within a certain distance of each other; the bar code should be within a certain range of angles relative to the optic axis of the cell phone camera; and there must be sufficient illumination falling on the bar code for the cell phone camera system to capture its image. In current camera cell phones, a desired image is generally captured by visually framing the image area in a display provided on the phone. This is a very approximate approach, and would be expected to have an unacceptably high failure rate if used for capturing bar codes, or to require a relatively long 'hold' time after framing the image area in order to provide enough time for the bar code to be located and recognized by the bar code processing circuitry in the cell phone.

The present invention therefore includes providing the cell phone with an aiming or targeting light pattern that is projected from the cell phone onto the bar code, thereby assisting with alignment of the target bar code indicia with the cell phone camera photosensor. The light source for the aiming pattern may be provided by one or more LEDs, or by one of more sources of laser light, such as a laser diode. Mirrors or diffractive elements may be used to shape the initial light output of the aiming source into various aiming patterns as described below. Moreover, the aiming light source may be any of a variety of colors/wavelengths, such as white, red, green, blue, or violet, and may be provided in more than one color, so that the user may select a particular color, or change colors, based on environmental conditions, the specifics of the bar code indicia being scanned, or for esthetic reasons.

Aiming patterns are well known in the bar code scanner art, and may take any form that provides visual guidance to the cell phone user for aligning the bar code indicia with the cell phone optics. The pattern may be limited to the periphery of the image area, such as a complete rectangle, corner brackets, line segments along at least two opposing sides of the image area, or some combination of corner brackets and line segments, all intended to directly mark at least a portion of the periphery of the imaging area. Alternatively the pattern may consist of elements inside the periphery of the imaging area, such as a central "X" or cross-hair pattern, which may be of any size ranging from just visible to extending to the periphery; a single central dot; or an array of dots, all intended to suggest or indicate the imaging area. It is also possible to combine peripheral elements with interior elements, such as by having corner brackets and/or line segments on the periphery of the image area combined with a central cross-hair or "X" pattern. The peripheral elements and the interior "X" or cross-hair pattern may appear as continuous lines, as dashed or dotted elements, or any combination thereof. It is also possible to provide an aiming pattern that has the form of a character, symbol, or image, such as a logo, and this potential may have special importance in cell phones given the relatively high importance given to style in the cell phone market.

While existing cell phones may include light sources for illuminating a target when taking a picture, these light sources generally involve flash illumination. This is inappropriate for scanning bar code indicia for a number of reasons. A flash has a very short duration which might not be sufficient for acquisition of the bar code pattern by the photosensor. In addition, a flash may provide too much illumination, and degrade the contrast needed for reading the bar code indicia by washing out the image or by causing specular reflection. Reading a bar code generally requires less intense illumination, over a longer time period, compared to a camera flash.

Therefore, and similar to the aiming pattern, the cell phone is provided with a bar code illumination source in the form of one or more LEDs, or by one or more sources of laser light, such as a laser diode. As with the aiming source, the illumination source may be provided in a variety of colors, such as white, red, green, blue, or violet, and may be provided in more than one color. This may enable the user to select a particular color, or change colors, based on environmental conditions, the specifics of the bar code indicia being scanned, or for esthetic reasons. In addition, the user or the bar code acquisition function provided in the cell phone may change the illumination color based on ambient lighting conditions and/or the specific bar code indicia being targeted. For example, while red is a common color for illuminating bar codes, it works poorly with the red-on-white bar codes used by the United States Postal Service. Moreover, the aiming source and the illumination source may be the same color, or different colors.

Power management is an important concern with cell phones in order to maximize battery life. For this reason, it is preferred to use a single light source to provide both the aiming pattern and the illumination. This could take the form of a single, steady illumination pattern that serves both to frame or bracket or target the bar code indicia, and to provide sufficient illumination for acquisition of the bar code image by the photosensor. Alternatively, the aiming pattern could take one form and/or be of one intensity, while the illumination function could involve a change in the pattern and/or intensity. Thus, by using one or more buttons or triggers on the cell phone, the user could initially produce an aiming pattern for aligning the bar code indicia, and then trigger a brighter and/or wider field of illumination for actually capturing the bar code. As an example, pressing a first button, or a given button part-way, could produce an aiming pattern, and once the target bar code indicia was properly framed, pressing a second button, or pressing the button the rest of the way, could switch to illumination mode, in which the rectangle or cross-hair would be replaced or supplemented by a more general and/or brighter field of illumination. The use of a combined aiming and illumination source would be especially suitable for reading 1D bar codes. Alternately the two functions may occur automatically sequentially in time, one after the other after an appropriate delay. This delay can also be programmable such that it can be optimized for different operators and operational environments. The bar code reading functionality may be accomplished with a special button that is readily recognized by the user, such as by being located separate from the other keys on the cell phone; being of a different shape from the other buttons; or bearing some tactile indicia that can be sensed by the user's thumb or finger to confirm that the correct button is being pressed. This might also be integrated with a biometric reader, such as a finger print reader. This would preclude use of the scanning function unless the cell phone was being held by a recognized user.

The illumination system in a cell phone is normally optimized to allow a single flash for each photo being taken, typically with several seconds between flashes. This time between flashes is often used to charge an energy holding element, such as a capacitor, until the second photo is ready to be taken. Often this process forces a minimum time delay between flashes. In a bar code reading application it is often necessary that more than one image be taken in very quick succession, for example with a separation of only 30 ms to 100 ms. This necessitates that the power supply be optimized for this functionality, as is usually the case in a normal bar code scanner.

The power conservation needs of cell cameras would also favor use of less energy-intensive decoding algorithms, that is, those which place less demand on the system processor and so consume less energy. For example the decoder may be optimized to decode only the UPC symbology, rather than a full suite of symbologies such as would be the case with a more conventional barcode reading system. Also in a effort to further reduce power consumption, the cell phone functionality may be turned off or disabled during the bar code reading process. The cell phone could have a chameleon aspect enabling it to be customized for different bar code symbologies. Based on a user request or triggered by use conditions, the cell phone could transmit a request for reprogramming to read a certain code or codes, and the necessary programming could be uploaded to the cell phone by wireless connection. Such programming would include not only the decoding algorithm necessary to decode the symbology in question, but also optimization of settings such as aiming, illumination, focal length, and exposure time for capturing and decoding that symbology.

Related to the above, it would be preferable to use a vertical pixel summing approach to acquire and decode the bar code whenever the bar code being read uses a vertically redundant symbology, such as UPC bar codes. The default approach of illuminating, capturing, an decoding information representing the entire image of a 1D bar code is relatively energy intensive in terms of use of memory and/or processing power. Because the information encoded in such bar codes is redundant in the vertical direction, it is possible to obtain a successful read by illuminating and/or capturing only a portion of the bar code, which portion will encompass the full width, but less than the full height, of the code. This may be done step-wise, for example, by first capturing a slice at the bottom of the code, then taking one or more additional slices spaced at vertical increments from the first slice, and summing the data from each slice only until enough information has been gathered to allow decoding. For example, the first horizontal slice might capture the lowermost portion of the code to a height of x pixels, and the next slice would capture a second portion having a height of y pixels, the second slice either overlapping, being immediately vertically adjacent to, or being spaced from, the first slice, and x and y being the same or different. This vertical summing of horizontal slices also significantly improves signal-to-noise ratio, decreasing the processing time needed to decode the symbol. This could also be accomplished by the use of a 2D imager and summing adjacent or offset rows or columns from the same image.

While remote decoding is possible, where the captured bar code image or a corresponding signal are transmitted to another device for decoding, it is preferred to provide the cell phone with on-board decoding.

The optics systems of camera cell phones are generally designed to take pictures at a range of perhaps three feet to infinity, while a bar code is usually scanned at a range of only several inches, such 3 or 4 to 7 or 8 inches. For this reason it is necessary to either provide a separate set of optics for the bar code scanning capability, which would add cost, or to enable the optics to change focus between the 'normal' range of three feet to infinity, and a close-up range for bar code scanning. This could be accomplished with conventional zoom lens/autofocus technologies. Alternatively, the cell phone may be provided with a switchable lens assembly, such as a fixed lens and one or more secondary lenses that may be superimposed over the fixed lens to change focal range. In addition, the cell phone could be provided with fluid/dynamic lens technology, or with liquid crystal lens technology, either by itself or in combination with conventional or fluid lenses, whereby application of voltage to the liquid crystal changes the refractive index, and therefore the focusing power, of the lens. With regard to fluid lens technology, reference is made to U.S. Provisional Patent Applications Ser. Nos. 60/717,583; 60/725,531; and 60/778,569, which are hereby incorporated in their entireties by reference thereto. With regard to liquid crystal lenses, reference is made to "Change of focus for liquid crystals", physicsweb, 19 May 2006 (http://physicsweb.org/articles/news/10/5/12/1), which itself references Appl. Phys. Lett. 88 191116; "Control optimization of spherical modal liquid crystal lenses", Optics Express, Vol. 4, Issue 9, pp. 344-352 (April 1999) and the references cited therein; A. F. Naumov, M. Yu. Loktev, I. R. Guralnik, and G. V. Vdovin. "Liquid crystal adaptive lenses with modal control," Opt. Lett. 23:992-994 (1998); "Liquid Crystal Lenses", University of Durham (UK) Astronomical Instrumentation Group (http://www.cfai.dur.ac.uk/fix/projects/lenses/lenses-_main.html); and Hands, J. W. Philip, Kirby, Andrew K., and Love, Gordon D., "Adaptive modally addressed liquid crystal lenses", Proc. SPIE. 5518: 136-143 (2004) and references cited therein; all the foregoing being hereby incorporated in their entireties by reference thereto.

The cell phone is also provided with wireless network connectivity, as with one or more of a wireless personal-area network (PAN), local area network (LAN), wide area network (WAN), metropolitan area network (MAN), or the Internet. This is to enable carrying out a transaction based on having read one or more bar codes with the cell phone. The connectivity could be accomplished with known technologies such as 802.11(x) or Bluetooth, or even using the cell phone's cellular network connectivity to transfer data by dial-up connection. This connectivity could be used to authorize the transaction desired by the cell phone user, preferably using secure communications procedures. The cell phone user could finish scanning, be presented with a summary of the transaction and associated charges, and authorize or approve the charges, all through the cell phone output and input devices. These could consist of a display and keypad, but could also extend to both speech generation and voice recognition technology. In this way the cell phone could use speech generation to provide a spoken summary of the transaction, and/or use voice recognition to carry out the user's commands.

Much of what has been described herein could also be carried out using Radio Frequency Identification (RFID) technology. In fact, the use of bar code scanning and RFID may be complementary. For example, the user could scan bar codes to create a list of products or services to be purchased, and transfer related information (whether the list itself, a charge amount corresponding to the list, authorization of charges, and so on) by RFID. One example would be purchasing goods in a store by scanning the bar codes associated with each desired item, and completing the transaction by a SmartCard-type proximity communication with a retail Point of Sale (POS) terminal. As a specific example, when ordering fast food either in the establishment or in a drive-through lane, one could select the desired menu items by scanning associated bar codes; communicate the resulting order to the store system by wireless communication, RFID, or even using one or more resulting bar codes generated by the cell phone, shown on the cell phone display, and presented to a store bar code scanner; and then pay for the order on a "touch-and-go" basis using the cell phone's RFID function.

Related to the above, goods or services may be purchased using any medium capable of displaying a bar code with sufficient resolution to be read by the cell phone. Such media could include electronic displays such as CRT, LCD, and plasma screen, in the form of a computer monitor, television, in-store display, electronic billboard, or a portable device such as a PDA or even another cell phone. This could provide additional security over a more conventional RF data link, because only the person scanning the presented bar code is able to record the information, not others also in the vicinity. Bar codes could of course also be read from more conventional printed media, including magazines, newspapers, and coupons, as well as electronic ink displays. The user could shop at home using the Internet to obtain bar codes for desired goods and/or services, either on a monitor or by print-out; scan those bar codes using his or her cell phone; and transmit the resulting order, and/or payment authorization, using the cell phone's wireless connectivity, either on the spot or at a later time and/or location.

In addition to completing or carrying out a transaction, the cell phone could be used to generate a list, such as a shopping list. For example, in a residence, as household consumables are used (for example packaged food items, paper goods, personal care items), the bar code on the packaging of the depleted item can be scanned before disposal, creating a list of what has been used and may therefore need replacement. This list could simply be used for future reference, as by being printed out or displayed at a later shopping opportunity. Alternatively, it could be used to generate a transaction request, either remotely (such as from home) or at a retail establishment. The user could transmit the list from home over the Internet using wireless connectivity, RFID, infrared, or any other suitable means to transmit the information from the cell phone to a home computer or similar device with the necessary connectivity to both the cell phone and the Internet or an outside network. That information could be transmitted to a vendor, who might assemble the goods and hold them for pickup, or arrange delivery or shipment to the user as instructed. Alternatively, the user could visit the vendor (grocery store, department store, pharmacy, hardware, etc.) and upload the list to a store system using any of the same connectivity modalities, receiving a printed list for use in shopping, or an assembled order, and could pay for the order using the cell phone after receiving, from the store system, and reviewing, a statement of associated charges.

The cell phone could also enable the user to perform an integrity check on their shopping list, by comparing bar codes stored in the cell phone or on a printed list to items scanned in the store, and showing the user which items had not yet been replaced. Returning to an earlier example, the user could create a list of items to be acquired in the cell phone memory, as by scanning items before disposal, uploading a shopping list including corresponding bar code information to the cell phone, or otherwise; and scan items at the store before placing them in a cart, with the cell phone tracking actual purchases against the saved list. The saved list could also interact with a store network, such as by guiding the user to the locations of desired items using the cell phone display, whether by using a graphical representation of the store layout, by aisle references, or in some other suitable manner. The cell phone could also generate a bar code using its own display, which the shopper could use, for example, by using an in-store terminal or price-checker kiosk, which would read the bar code on the cell phone display and perform any of a number of functions, including directing the item represented by the bar code to be provided to the customer, or providing the customer with item-related information such as location, price, and/or availability. In a similar fashion the cell phone could present a bar code containing the necessary credit card information allowing the transaction to be completed without the necessity of "swiping" a credit card, such as by scanning of the cell phone-presented bar code with the store's bar code scanner.

The invention has been described herein both in general terms and by use of a necessarily limited number of more specific examples. However, this invention may be embodied in various forms and should not be construed as limited to the embodiments set forth herein. Rather, these representative embodiments are described in detail so that this disclosure will fully convey the scope, structure, operation, functionality, and potential of applicability of the invention to those skilled in the art.

We claim:

1. A cellular camera telephone comprising:
   a photosensor for capturing an image of a target;
   at least one illumination source for projecting an aiming pattern to a bar code indicia in the target and illuminating the bar code indicia for image capture;
   a processor for decoding bar code indicia in the image;
   a button for activating image capture and decoding;
   a switchable lens assembly comprising a fixed lens and one or more secondary lens for superimposing over the fixed lens to change focal range of the cellular camera.

2. The cellular camera telephone set forth in claim 1 further comprising memory for storing bar code indicia in memory.

3. A cellular camera telephone in accordance with claim 1, wherein cell phone functionality is turned off during image decoding.

4. A cellular camera telephone in accordance with claim 1, wherein cell phone functionality is disabled during decoding.

5. A cellular camera telephone comprising:
   a photosensor for capturing an image of a portion of a bar code which encompasses the full width, but less than the full height of the bar code;
   at least one illumination source for projecting an aiming pattern onto the bar code indicia and illuminating the bar code indicia for image capture;
   a processor for decoding bar code indicia; and,
   a button for activating image capture.

6. A cellular camera telephone in accordance with claim 5, wherein the capturing is done step-wise.

7. A cellular camera telephone in accordance with claim 5, wherein the capturing comprises:
   capturing a first slice of the bar code at the bottom of the bar code;
   taking one or more additional slices spaced at vertical increments from the first slice; and,
   summing data from each slice only until enough information has been gathered to allow decoding.

8. A cellular camera telephone in accordance with claim 5, wherein the capturing comprises:
   capturing a first slice of the bar code at a portion of the bar code to a height of x pixels;
   capturing a second slice at a second portion having a height of y pixels, the second slice overlapping the first slice.

9. A cellular camera telephone in accordance with claim 8, wherein x and y are the same.

10. A cellular camera telephone in accordance with claim 5, wherein the capturing comprises:
    capturing a first slice of the bar code at a portion of the bar code to a height of x pixels;
    capturing a second slice at a second portion having a height of y pixels, the second slice being immediately vertically adjacent to the first slice.

11. A cellular camera telephone in accordance with claim 10, wherein x and y are the same.

12. A cellular camera telephone in accordance with claim 5, wherein the capturing comprises:
    capturing a first slice of the bar code at a portion of the bar code to a height of x pixels;
    capturing a second slice at a second portion having a height of y pixels, the second slice being spaced from the first slice.

13. A cellular camera telephone in accordance with claim 12, wherein x and y are the same.

* * * * *